United States Patent

Kawazoe

Patent Number: 5,504,639
Date of Patent: Apr. 2, 1996

[54] FLOATING HEAD MAGNETIC DISK RECORDING AND/OR REPRODUCING APPARATUS

[75] Inventor: Kazushige Kawazoe, Kanagawa, Japan

[73] Assignee: Sony Corporation, Tokyo, Japan

[21] Appl. No.: 384,873

[22] Filed: Feb. 7, 1995

Related U.S. Application Data

[62] Division of Ser. No. 205,370, Mar. 4, 1994.

[30] Foreign Application Priority Data

Mar. 12, 1993 [JP] Japan .................... 5-052546

[51] Int. Cl.$^6$ ............... G11B 21/20; G11B 5/60
[52] U.S. Cl. ........................... 360/103; 360/102
[58] Field of Search ..................... 360/103, 102

[56] References Cited

U.S. PATENT DOCUMENTS

| | | | |
|---|---|---|---|
| 4,605,977 | 8/1980 | Matthews | 360/103 |
| 4,670,804 | 6/1987 | Kant et al. | 360/102 |
| 4,928,195 | 5/1990 | Ezaki et al. | 360/103 |
| 5,138,511 | 8/1992 | Hoshimi et al. | 360/135 |

*Primary Examiner*—John H. Wolff
*Attorney, Agent, or Firm*—Hill, Steadman & Simpson

[57] ABSTRACT

A magnetic disk recording and/or reproducing method is utilized with a magnetic disk on which pre-formatting signals such as a servo signal for head positioning and an address signal are previously formed by uneven surfaces. The method employs a slider with a magnetic head mounted there. The mass (m) of slider, including the mass of the head, satisfies the following equalities;

$$m < 0.93 \times 10^6 \div (2\pi \times i \times n)^2$$

or $$m < 2.21 \times 10^6 \div (2\pi \times i \times n)^2$$

where (i) is the number of servo segments around a periphery of the disk and (n) is the rotation of the disk per second [rps]. The mass m of the slider and head is selected so that a passing frequency of the servo segments beneath the head is not equal to a resonance frequency between the slider containing the head and an air film located between the slider and the disk.

4 Claims, 5 Drawing Sheets

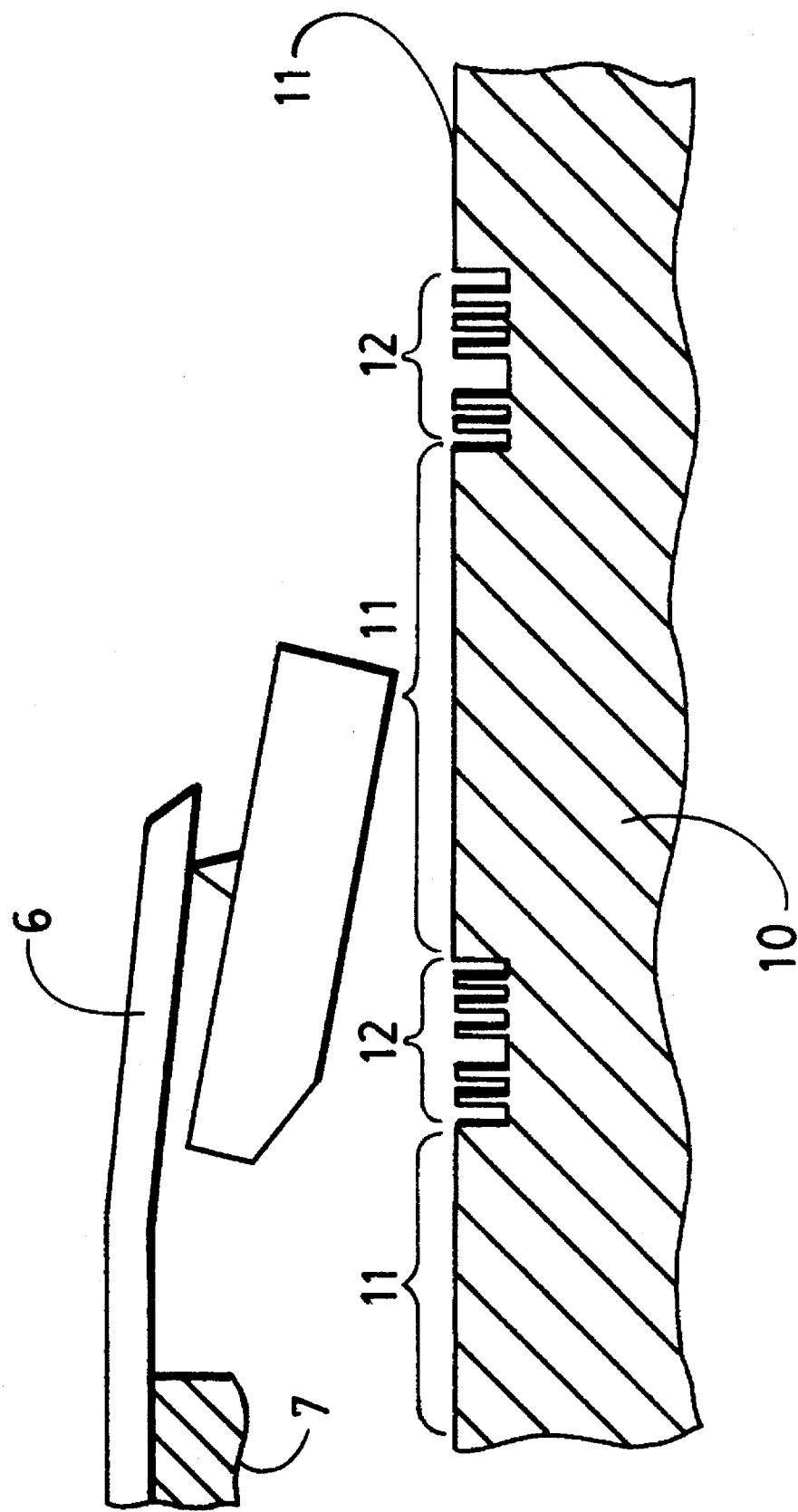

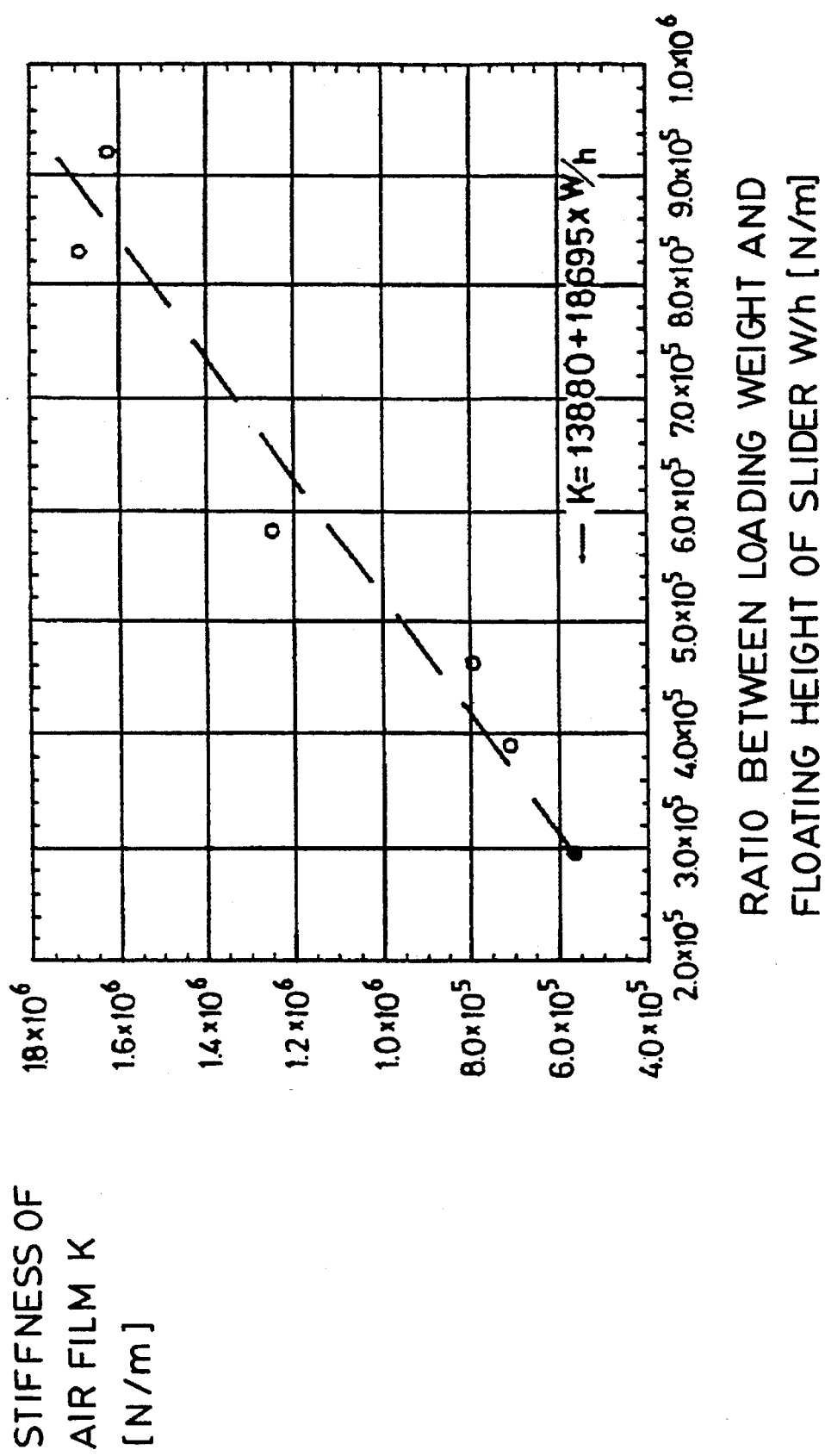

VARIED
FLOATING
HEIGHT
Δh

TIME

VARIED
FLOATING
HEIGHT
Δh

TIME

FLOATING HEAD MAGNETIC DISK RECORDING AND/OR REPRODUCING APPARATUS

This is a division of application Ser. No. 08/205,370, filed Mar. 4, 1994.

BACKGROUND

1. Field of the Invention

The present invention relates to a magnetic disk recording and/or reproducing apparatus. In particular, it relates to an apparatus utilized with a magnetic disk media on which preformatted signals such as a servo signal for positioning a head and an address signal are previously formed by uneven surfaces.

2. Background of the Invention

Recently, research and development have been performed on a hard disk drive with a magnetic disk which was manufactured by providing uneven surfaces on its substrate and by then coating a magnetic layer thereon. A servo signal for positioning a head on a magnetic disk has been proposed, as shown in FIG. 7A and FIG. 7B. FIG. 7A shows a plan view of an entire disk and FIG. 7B shows an enlarged plan view of an important portion of the disk. As shown in these drawings, there is a Data area (D) in tracks extending along a peripheral direction of a disk 10 and a Servo area or segment (S) along a radial direction of the disk 10 in which servo patterns are formed by uneven surfaces such as pits and lands in an optical disk.

When this disk starts rotating, a slider floats on the disk. Because of the uneven portions repeatedly formed around a track, the floating height of the slider may be varied as the disk rotates. A spacing may also vary between a magnetic head mounted on the slider and a magnetic layer of the disk. It causes a variation of a reproducing voltage. In the worst case, the slider would touch with the disk and generate the risk of crushing the head.

To avoid this variation of floating height, a method has been proposed for filling the hollowed portions of the pattern with resin so as to make them flat. However, it is very difficult to obtain a precise flatness by this method. In other words, when providing a polish to expose the magnetic layer after filling the uneven portions with resin, it is difficult to make them flat. This may be caused by the difference of hardness between the magnetic layer and the resin as a filling material, which may result in delicate uneven portions. In practice, a floating height of up to approximately 0.1 µm is utilized. But, it is desired to realize the floating height of around 0.05 µm to achieve a higher recording density. However, the above method for filling and flattening may not be suitable to obtain a surface which is flat enough for maintaining the floating height at a constant level.

SUMMARY OF THE INVENTION

It is, therefore, an object of the present invention to provide a magnetic disk recording and/or reproducing method which controls the variation of the floating height and the spacing of the magnetic head to stabilize the reproducing voltage.

It is another object of the present invention to provide a magnetic disk recording and/or reproducing method which reduces the occasion for the head to contact with the disk so that it may avoid head crush.

It is a further object of the present invention to provide a magnetic disk recording and/or reproducing method for which magnetic disks can be easily manufactured by avoiding the filling and flattening process for the uneven servo patterns.

In one aspect of the present invention, a magnetic disk recording and/or reproducing method is utilized with a magnetic disk on which pre-formatting signals such as a servo signal for positioning the head and an address signal are previously formed by uneven surfaces. The method is used with a slider with a magnetic head mounted there. The mass (m) of the slider, including the mass of the head, satisfies the following inequalities;

$m < 0.93 \times 10^6 + (2\pi \times i \times n)^2$ or $m > 2.21 \times 10^6 + (2\pi \times i \times n)^2$ where (i) is the number of servo segments around a periphery of the disk and (n) is the rotation the disk per second [rps].

In accordance with this invention, by selecting the entire mass (m) of the slider, the number of servo segments (i) and the disk rotations (n), the variation of the floating height of the head can be dramatically improved since a passing frequency of the servo segments beneath the head is not equal to a resonance frequency between the slider containing the head and an air film located between the slider and the disk.

DESCRIPTION OF THE DRAWINGS

FIG. 1 illustrates a mechanism of the invention.

FIG. 2 shows a relationship between the stiffness of air film and the loading weight and floating height of the slider.

DESCRIPTION OF THE INVENTION

Figure 3A:
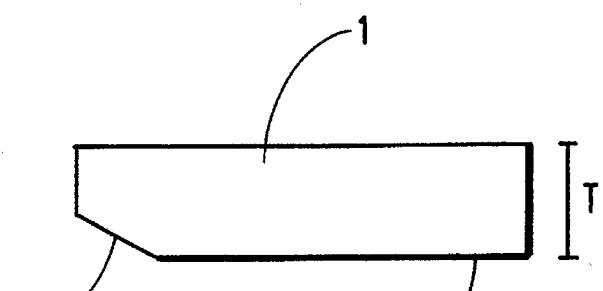
FIG. 3A shows a side view of a slider as an embodiment of the invention.

As a result of deep research and consideration paid by the inventor with a model mechanism shown in FIG. 1 including a magnetic disk 10 having servo segments 12 with uneven surfaces, it found that the trailing edge portion of a slider 1 floats in correspondence with a certain passing frequency because the slider 1 frequently passes over the servo pattern. It has also been found that the floating height of slider 1 varies very much in particular when the passing frequency over the servo patterns becomes equal to the resonance frequency between the slider 1 and the air film located between the slider 1 and the disk 10. In FIG. 1, an elastic load beam 6 supports the slider 1. An arm 7 supports the beam 6. The data segment 11 and servo segment 12 appear in order on the disk 10. An arrow (d) shows a direction of disk rotation. Considering the resonance frequency, further research has been made on the configuration of slider 1 and the relative movement between disk 10 and slider 1. With the detailed embodiment described below, it will be understood that the resonance of slider 1 can be avoided by this invention.

Figures 7A, 7B:
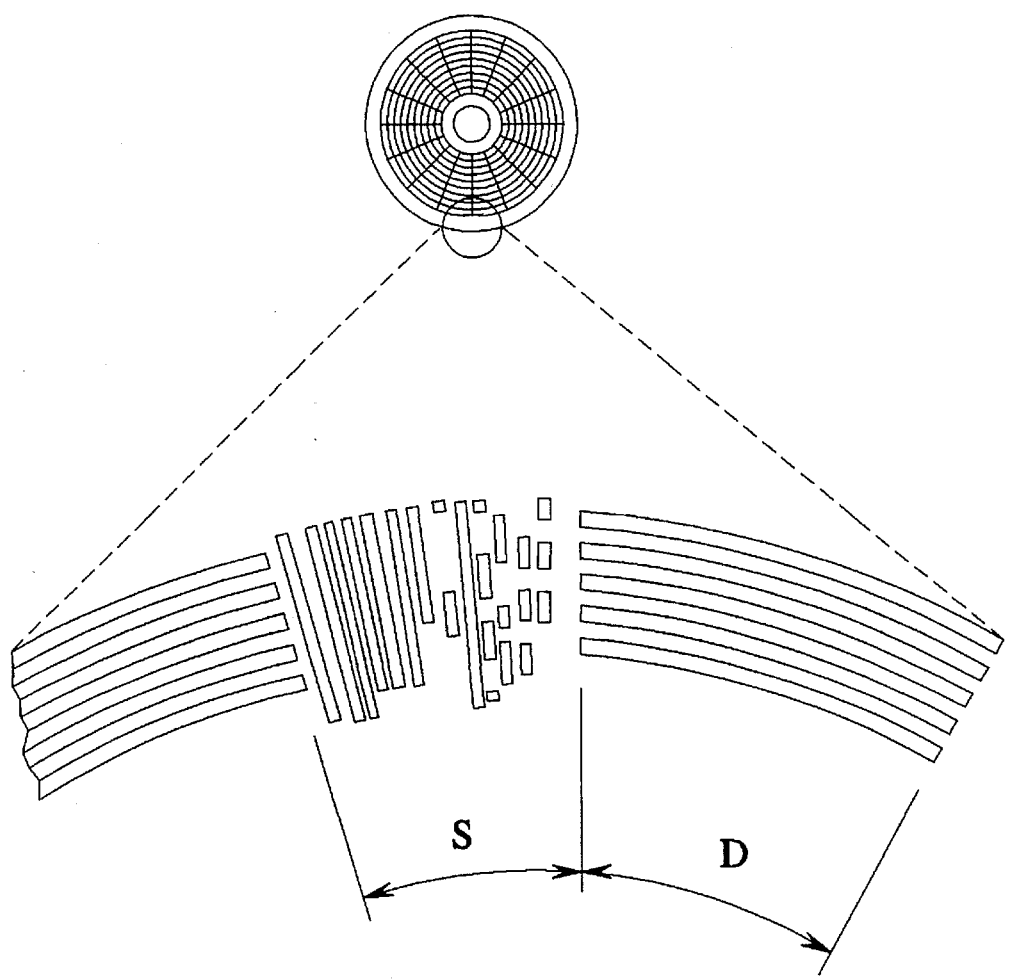
FIG. 7A shows a plan view of an entire disk.
FIG. 7B shows an enlarged plan view of an important portion of the disk.

Referring to the drawings, the embodiments of the invention will be explained. In this specification, any symbols will be bracketed whenever they represent certain units. As previously explained with FIGS. 7A and 7B, servo signals by use of uneven surfaces are formed along a radial direction in the servo segment (S) of disk 10. When the total number of servo segments around the disk is represented by (i) and the disk rotation is represented by (n) [rps], the passing frequency ($f_s$) [Hz] of the servo pattern which passes beneath the slider can be represented by the following equation.

$$f_s = i \times n \tag{1}$$

Since slider vibrates when the passing frequency ($f_s$) of the servo pattern becomes coincident with the resonance frequency ($f_n$) between the slider and the air film, it is necessary to design the slider so as to make these frequencies ($f_s$) and ($f_n$) different with respect to each other. The resonance frequency between the slider and the air film can be represented by the following equation (see, for an example, "*Report of Research for Implementation*" (NTT), vol. 28, no. 10, 1979);

$$f_n(\tfrac{1}{2}\pi) \times (K/m)^{1/2} \tag{2}$$

where (K) [N/m] is the stiffness of the air film and (m) [kg] is the mass of this slider including the head. Therefore, to be $f_s \neq f_n$, the following relation should be satisfied due to the equations (1) and (2).

$$(\tfrac{1}{2}\pi) \times (K/m)^{1/2} \neq i \times n \tag{3}$$

By modifying the above (3), the following relation can be obtained.

$$m \neq K \div (2\pi \times i \times n)^2 \tag{4}$$

On the other hand, when the loading weight of the slider is represented by (W) and the floating height is represented by (h), the stiffness (K) of air film is proportional to (W/h). This relation is described for an example by C. A. Briggs et al. (see, IEEE Transactions on Magnetics, vol. 26, no. 6, pp. 3027–3032, 1990) Table 1 shows the length of the slider [mm]; the width of the slider [mm], the loading weight [mN] or [gf] and the floating height [μm] of each of the sampled apparatus.

TABLE 1

|  | Length [mm] of slider | Width [mm] of slider | Loading Weight [mN] or ([gf]) | Floating Height [μm] |
|---|---|---|---|---|
| Sample 1 | 4.0 | 3.0 | 93.1 (9.5) | 0.1 |
| Sample 2 | 4.0 | 3.0 | 93.1 (9.5) | 0.20 |
| Sample 3 | 2.5 | 2.2 | 58.8 (6) | 0.07 |
| Sample 4 | 2.5 | 2.2 | 58.8 (6) | 0.15 |
| Sample 5 | 1.8 | 1.4 | 29.4 (3) | 0.05 |
| Sample 6 | 1.8 | 1.4 | 29.4 (3) | 0.10 |

In each of the sampled apparatus, the stiffness of the air film has been calculated and the relationship between (K) and (W/h) has been sought. The result is disclosed as FIG. 2. From the result shown in FIG. 2, the stiffness (K) of the air film can be represented by the following equation:

$$K = 1.8695 \times 10^3 \times (W/h) + 13.88 \times 10^3 \tag{5}$$

where (W) is the loading weight [N] of the slider and (h) is the floating height [m]. When the loading weight is 58.8 [mN] (6[gf]) and the floating height is in a range of 0.05~0.12 [μm] in practice, the stiffness of the air film can be obtained as follows by utilizing the equation (5).

$$K = 0.93 \times 10^6 \sim 2.21 \times 10^6 \tag{6}$$

This stiffness of the air film corresponds to the floating height 0.33~0.08 [μm] with the loading weight 39.2 [πN] (4[gf]) or the floating height 0.25~0.06 [μm] with the loading weight 29.4 [mN] (3[gf]).

With the above values of the air film stiffness, the relationship between the slider mass (m) [kg], servo patterns number (i) and disk rotation (n) [rps] can be obtained as follows to avoid the resonance of the slider.

$$m < 0.93 \times 10^6 \div (2\pi \times i \times n)^2 \tag{7}$$

or $$m > 2.21 \times 10^6 \div (2\pi \times i \times n)^2 \tag{8}$$

As understood by the above inequalities, the allowable range of the slider mass (m) may vary depending on the square of the product (i)×(n) once the servo segment number (i) and rotation (n) of the disk are determined. Examples are disclosed in Table 2 below.

TABLE 2

| Number of Servo Patterns | Disk Rotation [rps] | Allowable Slider Mass [mg] |
|---|---|---|
| 840 | 60 | 9.3 or less, 22.0 or more |
| 630 | 60 | 16.5 or less, 39.2 or more |
| 420 | 60 | 37.1 or less, 88.2 or more |
| 210 | 60 | 148.2 or less, 352.6 or more |

The variation difference in floating height has been measured and compared between the conventional recording and/or reproducing apparatus and that of this invention, in which the servo segments numbers, disk rotation and slider mass are selected as previously described. In practice, the same slider is utilized as described by the sample 5 in table 1, which has the length 1.8 [mm], width 1.4 [mm], loading weight 29.4 [mN] (3[gf]) and floating height 0.05 [μm]. The measurement has been performed by varying the rotation (n) of disk 10.

Figure 3B:
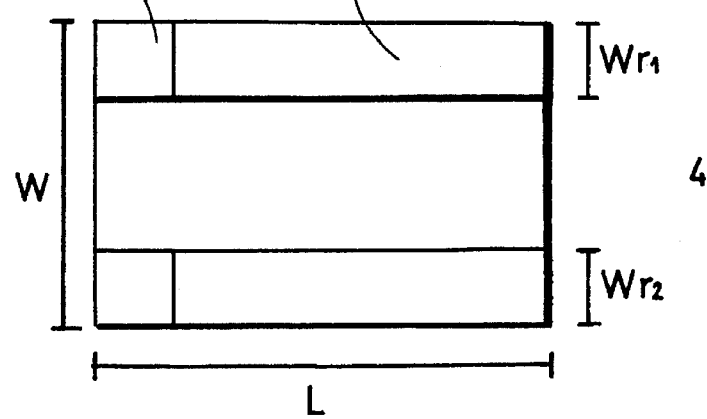
FIG. 3B shows a plan view from the floating surface of the slider in an embodiment of the invention.

FIG. 3A shows a side view of this slider 1 and FIG. 3B shows a plan view from the floating surface of the slider. As shown in FIG. 3B, the slider 1 has two parallel rail surfaces (floating surfaces) 2 facing down toward the disk. The relative movement with respect to the disk occurs along these the floating surfaces 2.

Figure 4:
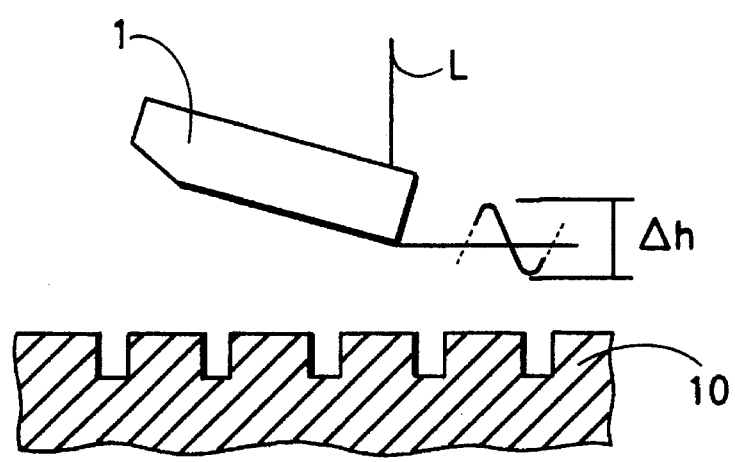
FIG. 4 illustrates how to measure the varying floating height.

The slider has a thickness (T) that is 0.6 [mm], and a width ($W_{r1}$) and ($W_{r2}$) that are 0.25 [mm]. It is made of $Al_2O_3$-TiC. On the other hand, the disk is made of a glass substrate and the number of servo segments (i) becomes 420. As shown by the arrow (L) in FIG. 4, a laser beam is irradiated to the top surface of slider 1, which is opposite to the disk 10. The reflected beam is sent to a laser doppler vibrometry in order to measure the vibration of slider 1.

Figure 5:
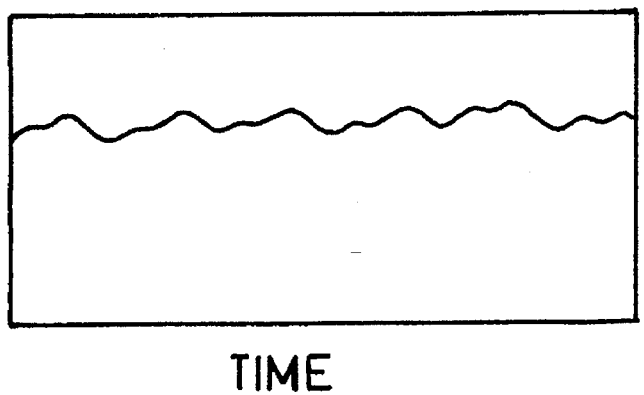
FIG. 5 shows the varying floating height in accordance with embodiment of the invention.

FIG. 5 shows the variation of floating height with the slider and disk as described before, when the disk rotation is adjusted so that the passing frequency of the servo pattern becomes 28 [KHz]. In FIG. 5, (Δh) shows a peak-to-peak variation of the floating height, which is the difference of distance between when the head is located at the farthest and the closest positions from the disk. As is clearly understood, the peak-to-peak variation (Δh) becomes extremely small in FIG. 5.

Figure 6:
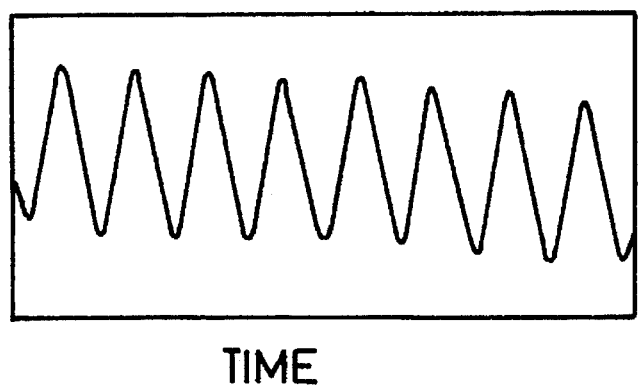
FIG. 6 shows the varying floating height in an example for comparison purposes.

With the same slider but different speed of rotation of disk 10, the passing frequency of the servo pattern becomes 42 [KHz], which is coincident with the resonance frequency. The peak-to-peak variation (Δh) at this time becomes extremely large as shown in FIG. 6.

Thus the variation of the floating height of the head can be dramatically improved in accordance with this invention. Since the spacing is more stabilized, the recording characteristics and the reproducing characteristics can be also improved. The probability of contacting the head with the disk can be dramatically reduced, and therefore the occasion of head crush can be avoided.

Furthermore, the process of filling and flattening the uneven servo patterns can be completely omitted by this invention.

While the invention has been described in conjunction with specific embodiments, it is evident that many alternatives, modifications, permutations and variations will become apparent to those skilled in the art in light of the foregoing description. For an example, Al can be utilized as well as glass for the material of the disk substrate. Therefore, the invention can be applicable and have the same effect with a hard disk. It is also applicable to a disk in which the uneven surfaces are simultaneously molded by PC (Polycarbonate) when its substrate is molded. It is possible to make various modifications on the slider configuration and the mechanism for mounting the head. The invention can be applicable to various kinds of magnetic recording and/or reproducing apparatus, for example with a head slider of a so-called "composite" type, which has a magnetic core material inserted into a groove of the slider. Accordingly, it is intended that the present invention embrace all such alternatives, modifications and variations as fall within the scope of the appended claims.

I claim:

1. A method for reducing a floating height variation of a slider containing a magnetic head which floats on an air film located between the slider and a magnetic disk having tracks containing data in a data area and having servo segments with each segment containing a servo pattern formed of uneven surfaces, comprising the steps of:

determining a passing frequency $f_s$ of the slider over the servo patterns by determining a total number i of servo segments around the disk and revolutions per second n of the disk, and determining the passing frequency as $f_s = i \times n$:

determining a resonance frequency $f_s$ between the slider and the air film located between the slider and the disk by use of a factor K for stiffness of the air film and based on a mass m of the slider including the head and determining the resonance as $f_n = (1/2\pi) \times (K/m)^{1/2}$.

selecting a mass of the head so that $f_n \neq f_s$ to reduce a floating height variation of the slider passing over the servo segments: and selecting the mass m so that m meets the following conditions:

$$0.93 \times 10^6 \div (2\pi \times i \times n)^2 < m > m 2.21 \times 10^6 \div (2\pi \times i \times n)^2.$$

2. A method for reducing a floating height variation of a slider containing a magnetic head which floats on an air film located between the slider and a magnetic disk having tracks containing data in a data area and having servo segments with each segment containing a servo pattern formed of uneven surfaces, comprising the steps of:

determining a passing frequency $f_s$ of the slider over the servo patterns:

determining a resonance frequency $f_n$ between the slider and the air film located between the slider and the disk; and selecting a mass of the head so that $f_n \neq f_s$ to reduce a floating height variation of the slider passing over the servo segments.

3. A method according to claim 2 including the steps of:

determining the passing frequency by determining a total number i of servo segments around the disk and revolutions per second n of the disk; and determining the resonance frequency between the slider and the air film by use of a factor K for stiffness of the air film and based on a mass m of the slider including the head.

4. A method according to claim 3 including the steps of determining the passing frequency as $f_s = i \times n$, and determining the resonance as $f_n = (1/2\pi) \times (K/m)^{1/2}$.

* * * * *